United States Patent
Renzi et al.

(10) Patent No.: US 11,046,812 B2
(45) Date of Patent: Jun. 29, 2021

(54) POLYMERIZABLE COMPOSITION BASED ON ALLYL CARBONATE MONOMERS, POLYMERIZED PRODUCT OBTAINABLE FROM SAID COMPOSITION AND USES THEREOF

(71) Applicant: MITSUI CHEMICALS, INC., Tokyo (JP)

(72) Inventors: Fiorenzo Renzi, Ravenna (IT); Roberto Forestieri, Ravenna (IT); Andrea Vecchione, Rimini (IT); Willem Bos, Arnhem (NL)

(73) Assignee: MITSUI CHEMICALS, INC., Tokyo (JP)

( * ) Notice: Subject to any disclaimer, the term of this patent is extended or adjusted under 35 U.S.C. 154(b) by 57 days.

(21) Appl. No.: 16/086,860

(22) PCT Filed: Mar. 28, 2017

(86) PCT No.: PCT/IB2017/051771
§ 371 (c)(1),
(2) Date: Sep. 20, 2018

(87) PCT Pub. No.: WO2017/168325
PCT Pub. Date: Oct. 5, 2017

(65) Prior Publication Data
US 2019/0100617 A1    Apr. 4, 2019

(30) Foreign Application Priority Data

Mar. 29, 2016 (IT) .................. 102016000032114

(51) Int. Cl.
| | | |
|---|---|---|
| *C08G 64/30* | (2006.01) | |
| *C08F 218/18* | (2006.01) | |
| *C08G 64/02* | (2006.01) | |
| *C08G 64/16* | (2006.01) | |
| *C08G 64/40* | (2006.01) | |
| *C08F 218/00* | (2006.01) | |
| *C08K 5/14* | (2006.01) | |

(52) U.S. Cl.
CPC .......... *C08G 64/305* (2013.01); *C08F 218/18* (2013.01); *C08G 64/0216* (2013.01); *C08G 64/1691* (2013.01); *C08G 64/40* (2013.01); *C08F 218/24* (2020.02); *C08G 2120/00* (2013.01); *C08K 5/14* (2013.01)

(58) Field of Classification Search
CPC .............. C08G 64/305; C08G 64/1691; C08G 64/0216; C08K 5/14
See application file for complete search history.

(56) References Cited

U.S. PATENT DOCUMENTS

| | | |
|---|---|---|
| 4,613,656 A | 9/1986 | Tang |
| 4,623,705 A | 11/1986 | Romano et al. |
| 4,686,266 A | 8/1987 | Tang |
| 4,713,433 A * | 12/1987 | Renzi ................ G02B 1/04 526/314 |
| 4,970,293 A | 11/1990 | Renzi et al. |
| 5,128,384 A | 7/1992 | Renzi et al. |

(Continued)

FOREIGN PATENT DOCUMENTS

| | | |
|---|---|---|
| EP | 0241997 A2 | 10/1987 |
| EP | 302537 * | 8/1989 |

(Continued)

OTHER PUBLICATIONS

Notice of Reasons for Refusal issued in corresponding Japanese Patent Application No. 2018-550881, dated Jun. 11, 2019, with English Translation (5 pages).

(Continued)

*Primary Examiner* — Kuo Liang Peng
(74) *Attorney, Agent, or Firm* — Buchanan Ingersoll & Rooney PC

(57) ABSTRACT

The present invention relates to a polymerizable composition based on allyl carbonate monomers comprising: —from 40% to 90% of a first reactive component (component A) comprising at least 50% by weight of diethylene glycol bis(allyl carbonate);

from 10% to 60% of a second reactive component (component B) consisting of at least one compound having general formula (II)

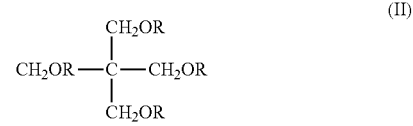

or having general formula (III)

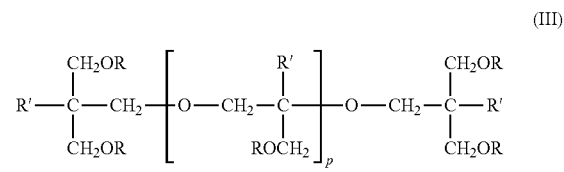

from 0.4 to 10.0 phm (parts by weight per 100 parts of the total weight of components A and B) of at least one peroxide radical initiator. The present invention also relates to the polymerized products that can be obtained from the above composition, their preparation process and their use as organic glass.

13 Claims, No Drawings

(56) References Cited

U.S. PATENT DOCUMENTS

| | | | |
|---|---|---|---|
| 5,280,051 A * | 1/1994 | Traverso | C04B 26/18 264/122 |
| 5,599,876 A | 2/1997 | Renzi et al. | |
| 6,812,265 B1 * | 11/2004 | Renzi | C07C 68/06 522/24 |

FOREIGN PATENT DOCUMENTS

| | | |
|---|---|---|
| EP | 0 302 537 B1 | 9/1991 |
| JP | S56-133246 | 10/1981 |
| JP | S62-256811 | 11/1987 |
| JP | S64-65107 | 3/1989 |
| JP | H02-38410 | 2/1990 |
| JP | H07-2938 | 1/1995 |

OTHER PUBLICATIONS

International Search Report (PCT/ISA/210) dated May 23, 2017, by the European Patent Office as the International Searching Authority for International Application No. PCT/162017/051771.

Written Opinion (PCT/ISA/237) dated May 23, 2017, by the European Patent Office as the International Searching Authority for International Application No. PCT/162017/051771.

Kirk-Othmer, Encyclopedia of Chemical Technology, Third edition, 1978, vol. 2, p. 112.

Encyclopedia of Chemical Processing and Design, 1977, vol. 2, p. 455.

Office Action dated Jul. 22, 2020, by the State Intellectual Property Office of the People's Republic of China in corresponding Chinese Patent Application No. 201780018652.X. (7 pages).

* cited by examiner

POLYMERIZABLE COMPOSITION BASED ON ALLYL CARBONATE MONOMERS, POLYMERIZED PRODUCT OBTAINABLE FROM SAID COMPOSITION AND USES THEREOF

The present invention relates to a polymerizable composition based on allyl carbonates, the polymerizable product that can be obtained from said composition and the relative uses.

The use of polymerizable organic compositions based on polyol(allyl carbonate) monomers, in particular diethylene glycol bis(ally carbonate), for preparing polymers that are rigid, colourless, and substantially transparent to visible light, is known in the state of the art. These compositions are used, for example, for producing organic glass or transparent coating films.

As is known, organic glass is used in substitution of mineral glass in numerous applications, such as, for example optical lenses, in particular ophthalmic lenses, or as elements of optical devices. Organic glass is also applied in the transport and building sectors.

The organic glass obtained through the polymerization of diethylene glycol bis(ally carbonate) monomers are substantially homopolymers of diethylene glycol bis(ally carbonate). In addition to having excellent physical and optical properties, these homopolymers offer the advantage of being able to be easily subjected to subsequent treatment, such as, for example, immersion tinting (dipping) in tinting baths for producing coloured organic glass (e.g. sun lenses).

Considering these advantageous properties, polymerizable compositions based on diethylene glycol bis(allyl carbonate) are currently the most widely-used material for the production of ophthalmic lenses (e.g. commercial products RAV7® of Acomon AG and CR39® of PPG Industries).

The polymerization reaction of diethylene glycol bis(allyl carbonate) monomers for forming the final polymerized product is a reaction initiated by means of free radicals. The free radicals are generally produced within the polymerizable composition following the addition of adequate precursor compounds (so-called polymerization initiators) and subsequent heating of the polymerizable composition.

The polymerization initiators most commonly used for the polymerization of compositions based on polyol(allyl carbonate), in particular diethylene glycol bis(allyl carbonate), are organic peroxides, in particular alkyl-peroxydicarbonates (e.g. isopropyl peroxydicarbonate (IPP) and isopropyl-sec-butyl peroxydicarbonate) and aroyl-peroxides (e.g. benzoyl peroxide).

The use of the above radical initiators, however, has various drawbacks mainly associated with the known instability of organic peroxides. Organic peroxides in pure form, in fact, are generally explosive.

For this reason, alkyl-peroxydicarbonates, for example, are generally used as radical initiators in the form of diluted solutions, for example in diethylene glycol bis(allyl carbonate).

Furthermore, this group of organic peroxides, even when diluted, must be preserved and transported at a low temperature (e.g. −20° C.) in order to avoid, or at least limit, decomposition reactions that jeopardize the quality of the initiator.

The dangerousness of organic peroxides together with the necessity of adopting strict measures for their preservation and transportation, significantly increases the final cost of the polymerized products.

In polymerizable compositions based on diethylene glycol bis(allyl carbonate) monomers, such as the commercial products RAV7® and CR39® used for the production of ophthalmic lenses, the peroxidic radical initiator (typically, isopropyl peroxydicarbonate (IPP) and isopropyl sec-butyl peroxydicarbonate) is typically present in an overall quantity equal to about 2.5% to 3.5% by weight with respect to the weight of the monomer (see for example: Kirk-Othmer Encyclopedia of Chemical Technology—Third edition—1978—Vol. II—page 112; Encyclopedia of Chemical Processing and Design—1977—Vol. 2—page 455).

Concentrations of peroxide higher than 3.5 wt % cause an increase in the production cost of the lens and the onset of various drawbacks during manufacturing, such as breakage of the lens when the mould is opened, detachment of the lens from the mould during polymerization, embrittlement and yellowing of the lenses and excessively long immersion staining times.

With concentrations of peroxide lower than 2.5%, on the other hand, lenses are generally obtained that are excessively flexible, easily abradable, difficult to tint by immersion (colour unevenness) and easily deformable following thermal treatment at the relatively high temperatures at which the treatment processes are carried out, such as the application of scratch-free paints or tinting by immersion.

A positive aspect associated with the use of a reduced quantity of initiator is the significant improvement in the colour of the lenses that are visually more attractive.

The necessity is therefore felt in the state of the art for polymerizable compositions based on allyl carbonate monomers that require reduced quantities of peroxide initiators for being converted into polymerized products in any case having the necessary characteristics for the various applications for which the polymerized products are destined.

U.S. Pat. No. 4,613,656 describes polymerizable compositions based on polyol-bis(allyl carbonate), in particular diethylene glycol bis(allyl carbonate), wherein a monoperoxycarbonate compound is used (for example, tert-butylperoxy isopropylcarbonate) as sole radical initiator, in a quantity equal to 0.75-1.50 parts by weight per 100 parts of monomer.

The polyol-bis(allyl carbonate) is obtained by phosgenation of a polyol (or allyl alcohol) and subsequent esterification with an allyl alcohol (or polyol). Oligomeric reactive units (oligomers) can also be formed from this reaction, i.e. compounds having two terminal allyl carbonate groups separated by a species containing two or more carbonate groups. In particular, in the case of diethylene glycol bis(allyl carbonate), these oligomers can be represented by formula (i)

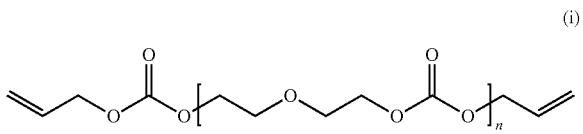

(i)

wherein n is an integer within the range of 2-5. The non-oligomeric reactive units (monomers), on the other hand, correspond to the above formula (i) wherein n is equal to 1.

The oligomers having formula (i) are present in the polymerizable composition in a quantity ranging from 2% to 20% by weight with respect to the total weight of all the reactive units.

The polymerizable composition can also contain further reactive units capable of participating in the formation of the polymer chains (comonomers). The comonomers have reactive terminal groups capable of reacting with the allyl terminals of the monomers having formula (i). Examples of these comonomers are compounds having terminal groups selected from:

vinylacetate, $C_1$-$C_2$ alkyl-(meth)acrylate or allyl(meth) acrylate. The comonomers can be present in the polymerizable composition in a quantity of up to 25% by weight of the polymerizable composition. EP 0241997 A2 describes a polymerizable composition for the production of organic glass having a high abrasion resistance comprising:

from 20% to 80% by weight of an oligomeric or essentially oligomeric product (i.e. prevalently consisting of oligomers) having two terminal allyl groups and that can be defined by formula (i):

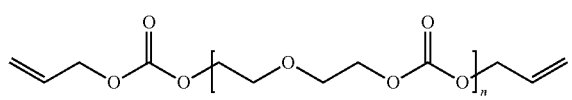
(i)

wherein: n has a value, or average value, ranging from 2 to 5 (Component A);

from 20% to 50% by weight of a monomeric or essentially monomeric product (i.e. prevalently consisting of monomer) having at least four terminal groups and that can be defined by formula (ii):

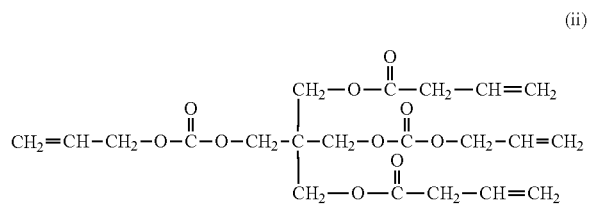 [SMILES: C=CCOC(=O)OCC(COC(=O)CC=C)(COC(=O)CC=C)COC(=O)OCC=C]
(ii)

or by formula (iii)

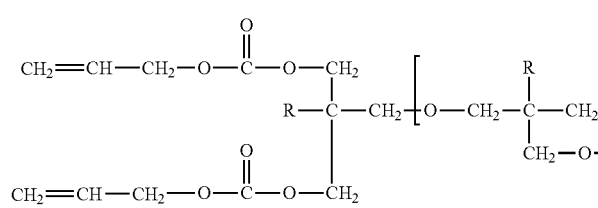

wherein: R is a methyl or ethyl group or can be represented with the formula

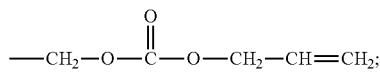

and n is 0 or 1 (Component B);

from 0% to 35% by weight of one or more reactive diluents having groups of the allyl, vinyl or methacrylic type (Component C).

The above composition is polymerized in the presence of one or more peroxide radical initiators, for example: diisopropyl peroxydicarbonate, dicyclohexyl peroxydicarbonate, disec-butyl peroxydicarbonate, dibenzoyl peroxide and tert-butyl perbenzoate. The initiator is present in the polymerizable composition in a quantity within the range of 1-6 parts by weight per 100 parts by weight of the sum of components (A), (B) and (C).

Considering the known art described above, the Applicant has set the primary objective of providing polymerizable compositions based on allyl carbonate monomers from which polymerized products with physico-mechanical and optical properties suitable for being used as organic glass, can be obtained.

In particular, an objective of the present invention is to provide polymerizable compositions with which polymerized products can be prepared, having physico-mechanical and optical properties comparable to those of polymerized products of the state of the art or even improved with respect to these, preferably using reduced quantities of organic peroxides as radical initiators.

The Applicant has found that the above and other objectives, which will appear more evident in the following description, can be achieved, according to a first aspect of the present invention, by means of a polymerizable composition based on allyl carbonate monomers comprising (weight percentages referring to the total weight of components A and B):

from 40% to 90% of a first reactive component (component A) having general formula (I)

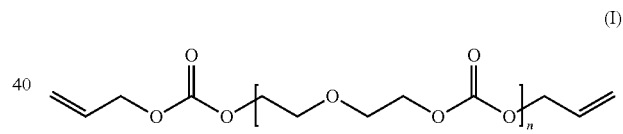
(I)

wherein n is an integer from 1 to 6, said component A comprising at least 50% by weight of a compound having general formula (I) wherein n is equal to 1;

from 10% to 60% of a second reactive component (component B) consisting of at least one compound having general formula (II)

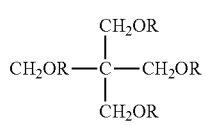

or having general formula (III)

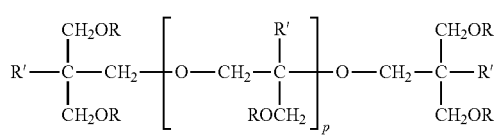

wherein in the above formulae (II) and (III):
p is equal to 0 or 1,
R, equal to or different from each other, are selected from:
a group having formula (IV)

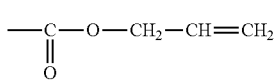

or a group having formula (V)

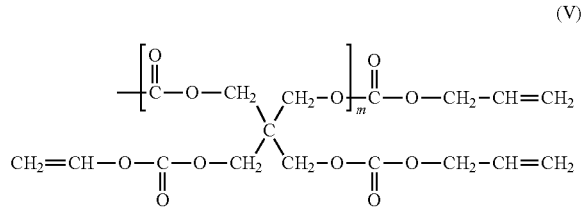

wherein m is an integer from 1 to 3;
R', equal to or different from each other, are selected from:
hydrogen, methyl, ethyl or a group

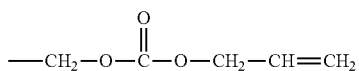

from 0.4 to 10.0 phm (parts by weight per 100 parts of the total weight of components A and B) of at least one peroxide radical initiator.

According to a second aspect, the present invention relates to a polymerized product that can be obtained from the polymerization of the above polymerizable compostion according to the present invention.

According to a third aspect, the present invention relates to a process for preparing a polymerized product, in particular an organic glass, comprising the step of thermally treating a polymerizable composition based on allyl carbonate monomers according to the present invention.

According to a further aspect, the present invention relates to the use of the above polymerizable compostion according to the present invention for producing an organic glass, in particular through mould casting.

According to a further aspect, the present invention relates to a method for producing an organic glass comprising the steps of:
a) injecting the abobe polymerizable composition into at least one mould having the shape desired for said organic glass;
b) thermally treating the composition injected into said mould to obtain said organic glass.

The Applicant has found that polymerizable compositions comprising the above component A as main allyl carbonate monomer combined with a comonomer represented by the above-mentioned component B, following a radical polymerization reaction, give rise to a polymerized product having physico-mechanical and optical properties comparable to, and in some cases even higher than, those of polymerized products that can be obtained from the polymerizable compositions of the known art.

In particular, starting from the polymerizable compositions according to the present invention, polymerized products having excellent physico-mechanical and optical characteristics can be obtained, also using reduced quantities of peroxide radical initiators.

For the purposes of the present description and relative claims, unless otherwise indicated, the concentration of an ingredient of the polymerizable composition different from the reactive components A and B is expressed in "phm" (part per hundred monomer), i.e. parts by weight per 100 parts of the total weight of the reactive components A and B.

For the purposes of the present description and relative claims, the verb "comprise" and all the terms deriving therefrom also include the meaning of the verb "consist" and the terms deriving therefrom.

For the purposes of the present description and relative claims, the compound having formula (I) wherein n is equal to 1 is also called "monomer" or "monomeric compound", whereas the compound having formula (I) wherein n is an integer from 2 to 6, is also called "oligomer" or "oligomeric compound".

For the purposes of the present description and relative claims, the compound having formula (II) wherein R is a group having formula (IV), is also called "monomer" or "monomeric compound", whereas the compounds having formula (II) wherein R is a group having formula (V) and the compounds having formula (III), are also called "oligomers" or "oligomeric compounds".

According to the present invention, at least 50% by weight of component A is composed of the compound having formula (I) wherein n=1 (monomer).

Said monomer is preferably present in a quantity higher than 50% by weight and lower than or equal to 70% by weight of component A; i.e. component A is a product prevalently containing compounds having formula (I) in the form of a monomer.

The remaining fraction of component A which is not composed of the above monomer consists of oligomers having formula (I). The remaining fraction of component A is composed of oligomers having formula (I) wherein the average value of n is within the range of 2-3 (weight average).

The relative concentrations of monomer and oligomers in the reactive components A or B, and also the average value of n of the oligomeric fraction of component A or B, can be determined by means of known methods. In particular, these values can be determined by means of HPLC or GPC analysis under conditions which are such as to obtain sufficiently separate peaks corresponding to the monomer and each of the oligomers of component A or B and the subsequent calculation of the percentage area of the chromatographic peaks associated with each of the monomeric and oligomeric compounds.

In the polymerizable composition according to the present invention, the reactive component A is preferably present in a quantity within the range of 50-85% by weight, more preferably within the range of 60-80% by weight, said percentages referring to the total weight of the reactive components A and B.

Component A can be obtained, for example, by reacting diallyl carbonate (DAC) and diethylene glycol (DEG) in a molar ratio DAC/DEG ranging from about 2.5/1 to about 5/1, preferably from about 2.5/1 to about 4/1, more preferably from about 2.75/1 to 3.5/1, under transesterification conditions and in the presence of a basic catalyst.

Operating, for example, with a molar ratio DAC/DEG equal to about 2.5/1, a mixture of monomer and oligomers having formula (I) is obtained, consisting for about 53% by weight of monomer (n=1) and the remaining 47% of oligomers (n=from 2 to 6).

Operating, for example, with a molar ratio DAC/DEG equal to about 3.5/1, on the other hand, a mixture of monomer and oligomers having formula (I) is obtained, consisting for about 67% by weight of monomer (n=1) and the remaining 33% of oligomer (n=2-6).

The transesterification reaction is preferably carried out at a temperature within the range of 50-150° C.

The transesterification reaction is preferably carried out at a pressure within the range of 0.01-1 atm.

The basic catalyst can be selected, for example, from hydroxides or carbonates of alkaline metals (e.g. NaOH, $Na_2CO_3$), alcoholates of alkaline metals or an organic base. The catalyst is preferably used in a quantity within the range of 1 to 1,000 ppm by weight with respect to the weight of the DEG.

Component B can be obtained by reacting diallyl carbonate (DAC) and at least one aliphatic polyol comprising at least 4 alcohol hydroxyl groups in a molar ratio DAC/polyol from 4/1 to 24/1, under transesterification conditions and in the presence of a basic catalyst.

The transesterification reaction can be carried out, for example, under the temperature and pressure conditions indicated above for the preparation of component A and also using the same catalysts and the same equipment.

The molar ratio DAC/polyol preferably ranges from 4/1 to 16/1, more preferably from 8/1 to 14/1, even more preferably from 10/1 to 14/1.

The above polyol is preferably selected from: di(trimethylolpropane), pentaerythritol, di(penta-erythritol) and tri(pentaerythritol); the above polyol is more preferably pentaerythritol.

In a preferred embodiment, component B is obtained by reacting diallyl carbonate and pentaerythritol in a molar ratio DAC/pentaerythritol ranging from 5/1 to 16/1, more preferably from 8/1 to 14/1, even more preferably from 10/1 to 14/1.

In the case of the reaction between DAC and pentaerythritol in a molar ratio DAC/pentaerythritol equal to about 10/1, a mixture is obtained containing approximately:
   45% by weight of compounds having formula (II) wherein the radical R is the group having formula (IV) (monomer);
   55% by weight of compounds having formula (II) wherein the radical R is the group having formula (V) (oligomer).

When the molar ratio DAC/pentaerythritol is equal to about 14/1, a mixture of compounds is obtained containing approximately:
   60% by weight of compounds having formula (II) wherein the radical R is the group having formula (IV) (monomer);
   40% by weight of compounds having formula (II) wherein the radical R is the group having formula (V) (oligomer).

At least 50% by weight of component B preferably consists of monomeric compound, the remaining fraction being composed of oligomeric compounds.

Component B is preferably present in the polymerizable composition according to the present invention in a quantity within the range of 15-50% by weight, more preferably within the range of 20-40% by weight, said percentages referring to the total weight of components A and B.

The use of the above allyl carbonate monomer A combined with the above allyl carbonate comonomer B, within an industrial production process of polymerized products starting from the polymerizable compositions according to the present invention, generally advantageously results in a lower overall consumption of raw materials with respect to the processes of the known art in which the polymerizable compositions described in EP 0241997 A2 are used, for example.

For example, in the case of the preparation of a polymerized product starting from the polymerizable composition according to the present invention, wherein component A is the product of the transesterification reaction between DAC and DEG in a DAC/DEG ratio equal to 3/1, and component B is the product of the transesterification between DAC and pentaerythritol in a DAC/pentaerythritol ratio equal to 12/1, the overall consumption of raw materials is about 20% lower with respect to the case in which composition nr. 2 of Example 2 of EP 0241997 A2 is used, wherein component A is obtained from the reaction between DAC and DEG in a DAC/DEG ratio equal to 2/1 and component B is obtained from the reaction between DAC and pentaerythritol in a DAC/pentaerythritol ratio equal to 24/1 (considering, in both cases, a polymerizable composition composed for 75% by weight of component A and 25% by weight of component B).

Further details on the preparation of components A and B can be found, for example, in EP 0035304 A2 and EP 0241997 A2.

The polymerizable composition according to the present invention can optionally also contain other comonomers (component C) having ethylene unsaturations capable of polymerizing with components A and B by initiation with free radicals, such as, for example, allyl, allyl carbonate, maleate, vinyl or $C_1$-$C_4$ alkyl(meth)acrylate groups.

The comonomers that can be used as component C in the polymerizable composition according to the present invention are preferably selected from: vinyl acetate, dimethyl maleate and methyl methacrylate.

Advantageously component C can be added, for example, to obtain the desired viscosity values of the polymerizable composition or to reduce the concentration of peroxide necessary for the polymerization, the functional groups of the above-mentioned comonomers, in fact, being more reactive with respect to the allyl groups.

The comonomers can be present in a quantity of up to 25 phm, preferably up to 10 phm, more preferably up to 5 phm.

In a particularly preferred embodiment, component C is substantially absent or in any case present in such a quantity that the physico-mechanical and optical properties of the polymerized products obtained (for example, refractive index, abrasion resistance) are substantially the same as those of the polymerized products obtained starting from component A and B alone, in the absence of component C.

The viscosity at 25° C. (measured according to ASTM D446 with a KPG Ubbelodhe viscometer, capillary type 2C) of the polymerizable composition is within the range 20-120 cSt. Said viscosity is preferably lower than 100 cSt, more preferably lower than or equal to 85 cSt, even more preferably lower than or equal to 75 cSt. Said viscosity is preferably equal to or higher than 40 cSt.

It should be noted that the use of polymerizable compositions having relatively low viscosity values increases the productivity of industrial production processes of polymerized products. Less viscous polymerizable compositions can in fact be injected more rapidly and more easily into the moulds, thus increasing the production yield of the production process.

According to the present invention, the polymerization initiator is preferably selected from organic peroxides capable of generating free radicals within the temperature range of 30-120° C.

The radical initiator can be in solid form or liquid form at ambient temperature (25° C.)

The radical initiator is preferably selected from:
peroxymonocarbonate esters (e.g.tert-butyl peroxyisopropyl carbonate)
peroxydicarbonate esters (e.g. di(2-ethylhexyl) peroxydicarbonate, cyclohexyl peroxydicarbonate, di(cyclohexyl) peroxydicarbonate, di(sec-butyl) peroxydicarbonate and diisopropyl peroxydicarbonate,
diacylperoxides (e.g. 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide),
peroxyesters (e.g. t-butylperoxy pivalate, t-butylperoxy octylate and t-butylperoxy butyrate), and mixtures thereof.

The initiator is more preferably selected from: peroxymonocarbonate esters, peroxydicarbonate esters, diacyl peroxides and mixtures thereof.

Preferred peroxymonocarbonate esters and peroxy-dicarbonate esters are those having the following formulae (VI) and (VII)

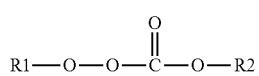
(VI)

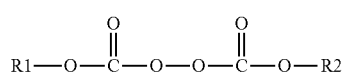
(VII)

wherein $R_1$ and $R_2$, the same or different, are selected from: $C_1$-$C_{20}$ alkyl, $C_1$-$C_{20}$ alkenyl or $C_1$-$C_{20}$ cycloalkyl.

$R_1$ and $R_2$ preferably have from 2 to 16 carbon atoms, more preferably from 3 to 7 carbon atoms.

$R_1$ and $R_2$ can be linear or branched, and possibly substituted (for example with at least one halogen atom (e.g. Cl or Br) or a $NO_2$ group).

Examples of $R_1$ and $R_2$ groups are: methyl, ethyl, n-propyl, isopropyl, n-butyl, sec-butyl, isobutyl, and hexyl.

The above peroxides and the relative preparation methods are known to the person skilled in the art.

The quantity of initiator used for initiating the radical polymerization reaction of the polymerizable compositions according to the present invention varies in relation to the initiator used.

The polymerization initiator is preferably present in an overall quantity equal to or higher than 0.5 phm, more preferably in a quantity equal to or higher than 1.0 phm.

The polymerization initiator is preferably present in an overall quantity equal to or lower than 7.0 phm, more preferably in a quantity equal to or lower than 5.0 phm.

The polymerization initiator is preferably present in an overall quantity within the range 0.4-5.0 phm, more preferably within the range 0.5-3.5 phm.

In a particularly preferred embodiment, the polymerization initiator is a compound having formula (VII), preferably present in an overall quantity equal to or lower than 3.0 phm, more preferably in a quantity equal to or lower than 2.5 phm.

The polymerization initiator having formula (VI) is preferably present in an overall quantity equal to or higher than 0.4 phm, more preferably in a quantity equal to or higher than 0.5 phm.

The polymerization initiator having formula (VI) is preferably present in an overall quantity equal to or lower than 0.7 phm.

In another particularly preferred embodiment, the polymerization initiator is a compound having formula (VII), preferably present in an overall quantity equal to or higher than 0.5 phm, more preferably in a quantity equal to or higher than 1.0 phm.

The polymerization initiator having formula (VII) is preferably present in an overall quantity equal to or lower than 5.0 phm.

In a particularly preferred embodiment, the polymerization initiator having formula (VII) is present in an overall quantity equal to or lower than 3.0 phm, more preferably in a quantity equal to or lower than 2.5 phm.

A preferred diacylperoxide is dibenzoil peroxide (BPO).

The Applicant has surprisingly found that, with the polymerizable compositions according to the present invention, polymerized products can be obtained, having optical and physico-mechanical properties comparable to or much higher than those of the polymerized products composed of the homopolymer of diethylene glycol bis (ally carbonate), using a reduced quantity of initiator with respect to the quantity necessary for obtaining the above homopolymer.

The polymerizable compositions according to the present invention can contain one or more conventional additives, such as, for example: stabilizing agents, detaching agents, dyes, photochromatic dyes, pigments, UV-absorbers, IR-absorbers and the like. These additives are present preferably in an overall quantity not higher than 2 phm.

The conversion of the polymerizable compositions according to the present invention into polymerized products can be effected using the polymerization techniques of the known art.

The polymerization of the polymerizable compositions according to the present invention is advantageously carried out using the technique of casting in moulds. The casting technique envisages the injection of the polymerizable composition into a mould having the desired shape for the final product, for example an optical or ophthalmic lens. The polymerizable composition is then thermally treated to form the final polymerized product.

The thermal treatment is carried out at a temperature which is such as to form free radicals in the polymerizable composition, starting from peroxide initiators and then initiating the polymerization.

The thermal treatment is effected at one or more temperatures for a variable time in relation to the peroxide radical initiator used and components A and B.

The thermal treatment is preferably carried out within a temperature range of 30-100° C.

The duration of the thermal treatment is preferably within the range of 2-80 hours.

The polymerized products obtained from the polymerizable compositions according to the present invention are solid and substantially transparent to visible light and can therefore be used as ophthalmic lenses, sun lenses, screens and protective visors, camera filters, plates and glass for the civil sector, transparent elements for cars and aircraft (eg. windshields, sunroofs, lights, etc.).

The polymerized products preferably have a refractive index $n^D_{20}$ (ASTM D-542) within the range of 1.495-1.530.

The polymerized products preferably have a yellow index (ASTM D-1925) lower than 2.0 measured on plaques having a thickness of 5 mm.

The polymerized products preferably have a light transmittance value (ASTM D-1003) equal to or higher than 90% measured on neutral lenses having a thickness of 2 mm.

The polymerized products preferably have a Haze value (ASTM D-1003) lower than 0.5% measured on neutral lenses having a thickness of 2 mm.

The polymerized products preferably have a Rockwell Hardness M (ASTM D-785) equal to or higher than 85, more preferably equal to or higher than 90, even more preferably equal to or higher than 95, measured on plaques having a thickness of 5 mm.

The polymerized products preferably have an impact strength measured by means of the Ball Drop Test (American National Standard Z87.1-2003) higher than 68 grams.

The polymerized products preferably have a distortion temperature under load of 1.82 MPa (HDT) (ASTM D-648) equal to or higher than 55° C.

The polymerized products preferably have a Bayer Abrasion value (ASTM F-735) equal to or higher than 0.8.

The following embodiment examples are provided for purely illustrative purposes of the present invention and should not be considered as limiting the protection scope defined by the enclosed claims.

EXAMPLES

1. Preparation of Components A and B and of the Polymerizable Mixtures

The reactive component A was prepared by reacting diallyl carbonate (DAC) and diethylene glycol (DEG), in a DAC/DEG molar ratio of 3/1 in a reactor equipped with a stirrer and distillation column to remove the allyl alcohol produced during the reaction.

The reagents were charged into the reactor according to the required molar ratio and the mixture obtained was deaerated before the addition of the catalyst (sodium methylate in a concentration of 100 ppm by weight with respect to the weight of DEG). After bringing the pressure inside the reactor to about 150-200 mbar, the heating was started, until the temperature of the beginning of the distillation of allyl alcohol, within the range of 95-100° C., was reached.

The theoretical quantity of allyl alcohol which develops with the total conversion of DEG is equal to 2 moles per mole of DEG. The reaction is considered as being complete when the theoretical quantity of allyl alcohol has been collected.

The pressure inside the reactor was then gradually reduced to remove the excess DAC. The residual quantity of DAC depends on the degree of vacuum: by operating at 10 mbar, a product is obtained with a residual quantity lower than 1%.

Through HPLC analysis, it was determined that component (A) is composed of the monomer (diethylene glycol bis(allyl carbonate) in a quantity of about 63% by weight with respect to component A, the remaining percentage consisting of oligomers having formula (I) wherein the average value of n is equal to about 2.5. The HPLC analysis of component A was carried out under the following conditions: temperature=25° C.; sample of A subjected to analysis in the form of a 10% by weight solution of acetonitrile; sample injected=5 microliters; eluent: a mixture of acetonitrile/water (45/55% by volume); UV detector.

Component B was obtained by reacting diallyl carbonate (DAC) and pentaerythritol in a DAC/pentaerythritol molar ratio of 12/1, under the same conditions and using the same equipment described above for the preparation of component A.

HPLC analysis revealed that component (B) is composed of a mixture containing about:
- 55% by weight of compounds having formula (II) wherein the radical R is the group having formula (IV) (monomer);
- 45% by weight of compounds having formula (II) wherein the radical R is the group having formula (V) (average value of m in formula (V) equal to about 2.5) (oligomers).

The HPLC analysis of component B was carried out under the following conditions: temperature=25° C.; sample of A subjected to analysis in the form of a 10% by weight solution of acetonitrile; injected sample=5 microliters; eluent: mixture of acetonitrile/water (70/30% by volume); UV detector.

Mixtures containing 75% by weight of component A and 25% by weight of component B, were prepared starting from the reactive components A and B. A radical initiator and a UV absorber were then added to the mixtures, in the quantities indicated hereunder.

The radical initiator of the group of the peroxydicarbonate esters is the commercial product Trigonox ADC-NS30® by Akzo Nobel. This product contains about 70% by weight of diethylene glycol bis(allyl carbonate) and 30% by weight of a mixture of isopropyl peroxydicarbonates, sec butyl and isopropyl/sec-butyl.

The radical initiator of the group of the diacylperoxides is dibenzoil peroxide (BPO), commercial product Perkadox CH-50L® by Akzo Nobel. This product contains about 50% by weight of benzoil peroxide and 50% by weight of dicyclohexyl phtalate.

The UV absorber is 2-hydroxy,4-methoxybenzophenone (Lowilite 20° by Addivant).

The viscosity at 25° C. of the mixture of components A and B, before the addition of the initiator, is equal to 55 cStokes and the specific weight at 20° C. is 1.184 g/cm³.

2. Characterization of the Polymerized Products

The polymerizable compositions were polymerized in the form of flat sheets having a thickness ranging from 3 mm to 5 mm and neutral lenses having a thickness of 2 mm, by casting in glass moulds. The moulds are composed of two glass half-moulds joined to each other by means of a spacer gasket made of plasticized polyvinylchloride (sheets) or low-density polyethylene (LDPE) (lenses), forming a cavity suitable for containing the polymerizable composition.

The polymerization was carried out by means of thermal treatment in a forced-air-circulation oven, with a gradual temperature rise as indicated hereunder. At the end of the thermal treatment, the moulds were opened and the lenses were kept at 110° C. for 1 hour in order to decompose the possible residual peroxide initiator.

The following characterization tests were carried out on the polymerized products obtained in order to determine their physico-mechanical and optical properties.

The following characteristics were determined on the flat sheets:

(a) Optical Characteristics

Refractive index ($n^D_{20}$): measured with an Abbe refractometer (ASTM D-542);

Yellow index (YI), (ASTM D-1925), determined with a GretagMacbeth 1500 Plus spectrophotometer and defined as: YI=100/Y·(1.277X-1.06Z);

Haze % and Light Transmittance (ASTM D-1003) determined with a Haze-gard plus instrument;

(b) Physico-Mechanical Characteristics

Specific weight: determined with a hydrostatic balance at 20° C. (ASTM D-792);

Volume contraction in polymerization (shrinkage) calculated with the formula:

$$\text{Shrinkage (\%)} = \frac{\text{Polymer density} - \text{Monomer density}}{\text{Polymer density}} \times 100$$

Rockwell Hardness (M) measured with a Rockwell durometer (ASTM D-785);

Impact strength (Ball Drop Test—American National Standard Z87.1-2003);

Distortion temperature under load 1.82 MPa (HDT) (ASTM D-648).

The following properties were determined on the neutral lenses:

(c) Tintability

The capacity of the polymerized product of superficially adsorbing a colouring agent was determined by immersing a neutral lens in an aqueous bath in which the commercial dye BPI gray diluted at 10% by weight in demineralized water, was dispersed.

The lens was immersed in the tinting bath for 20 minutes at a temperature of 90° C. After rinsing with demineralized water, the Transmittance % of the lens was determined under the terms of the standard ASTM D-1003.

(d) Abrasion Resistance

The capacity of the polymerized product of resisting surface abrasion was determined with a Taber oscillating abrasimeter, according to the method ASTM F-735. This method involves contemporaneously subjecting the sample lens and a reference lens made of diethylene glycol bis(allyl carbonate) (CR39®) to 600 oscillating cycles with the abrasive material Alundum ZF-12.

The ratio between the increase in Haze measured with the instrument Haze-gard plus according to ASTM D-1003 after the abrasion cycles on the sample lens and on the reference lens represents the Bayer abrasion resistance value (BA).

$$\text{Bayer Abrasion} = \frac{\Delta \text{Haze (reference lens)}}{\Delta \text{Haze (sample lens)}}$$

Values or the BA j—cate an abrasion resistance higher than that of the reference material; values of the BA index lower than 1 indicate an abrasion resistance lower than that of the reference material.

3. Polymerizable Compositions Nr. 1-6

The chemical composition of the polymerizable compositions nr. 1-3 according to the present invention is indicated in Table 1.

TABLE 1

Polymerizable compositions nr. 1-3 according to the invention

| | Composition N° | | |
|---|---|---|---|
| | 1 | 2 | 3 |
| Component (A) + Component (B) | 93.05$^a$ | 93.25$^a$ | 93.45$^a$ |
| Peroxide initiator | 6.9$^b$ (2.22)$^c$ | 6.7$^b$ (2.16)$^c$ | 6.5$^b$ (2.09)$^c$ |
| UV absorber | 0.05$^a$ | 0.05$^a$ | 0.05$^a$ |

$^a$weight percentage referring to the total weight of the polymerizable composition;
$^b$weight percentage of the commercial product Trigonox ADC-NS30 referring to the total weight of the polymerizable composition;
$^c$Overall concentration of peroxide compounds expressed as phm (parts by weight per 100 parts of the total weight of components A and B).

For comparative purposes, the following polymerizable compositions nr. 4*-6* also containing 0.05% of UV absorber, were also prepared:

nr. 4*: composition containing 93.05% by weight of diethylene glycol bis(allyl carbonate) (RAV 7AT®) as sole monomer, 0.05% by weight of UV absorber (Lowilite 20®) and 6.9% by weight of peroxide initiator (Trigonox ADC-NS30);

nr. 5*: composition containing 88.95% by weight of diethylene glycol bis(allyl carbonate) (RAV 7AT®) as sole monomer, 0.05% by weight of UV absorber (Lowilite 20®) and 11% by weight of peroxide initiator (Trigonox ADC-NS30);

nr. 6*: composition containing:

(i) 65.28% by weight of the product obtained from the reaction between DAC and DEG, in a molar ratio equal to 2/1; said product contains 54% by weight of oligomers and 46% of monomer (diethylene glycol bis(allyl carbonate));

(ii) 27.97% by weight of the product obtained from the reaction between DAC and pentaerythritol in a molar ratio equal to 24/1 (comonomer); said product contains 73% by weight of monomer having formula (II) wherein the radical R is the group having formula (IV) and 27% of compounds having formula (II) wherein the radical R is the group having formula (V) (average value of m in formula (V) equal to about 1.3) (oligomers); HPLC analysis of component (ii) was carried out under the same conditions used for the analysis of component B of the present invention (see previous item 1);

(iii) 0.05% by weight of UV absorber (Lowilite 20®);

(iv) 6.7% by weight of peroxide initiator (Trigonox ADC-NS30).

The chemical composition of the polymerizable compositions nr. 4*-6* is indicated in Table 2.

TABLE 2

Comparative polymerizable compositions nr. 4*-6*

| | Composition N° | | |
|---|---|---|---|
| | 4* | 5* | 6* |
| Monomer + possible comonomer | 93.05$^a$ | 88.95$^a$ | 93.25$^a$ |
| Peroxide initiator | 6.9$^b$ (2.22)$^c$ | 11.0$^b$ (3.71)$^c$ | 6.7$^b$ (2.09)$^c$ |
| UV absorber | 0.05 | 0.05 | 0.05 |

$^a$weight percentage referring to the total weight of the polymerizable composition;
$^b$weight percentage of the commercial product Trigonox ADC-NS30 referring to the total weight of the polymerizable composition;
$^c$Overall concentration of organic peroxide expressed as phm (parts by weight per 100 parts of the total weight of the monomer and possible comonomer).

The polymerizable compositions Nr. 1-6 were subjected to polymerization by means of thermal treatment in a forced-air-circulation oven, with a gradual temperature rise from 40° C. to 80° C. according to the following curve: maintaining at 40° C. for 3 hours; temperature rise from 40° C. to 50° C. in 7 hours; temperature rise from 50° C. to 80° C. in 9 hours; maintaining at 80° C. for 1 hour.

At the end of the thermal treatment, the polymerized products (neutral lenses and flat sheets) were recovered from the moulds and heated to 110° C. for hour (in order to decompose the possible residual radical initiator).

The results of the characterization of the polymerized products are indicated in Tables 3 and 4.

TABLE 3

Properties of the polymerized products according to the invention

| | Composition N° | | |
|---|---|---|---|
| | 1 | 2 | 3 |
| Refractive index ($n^D{}_{20}$) | 1.500 | 1.500 | 1.500 |
| Yellow index (5 mm) | 1.30 | 1.22 | 1.20 |
| Haze, % | 0.13 | 0.14 | 0.11 |
| Transmittance, % | 93.3 | 93.3 | 93.3 |
| Specific weight, g/cm$^3$ | 1.329 | 1.329 | 1.329 |
| Shrinkage, % | 11.0 | 11.0 | 11.0 |
| Rockwell hardness (5 mm), M | 103 | 102 | 100 |
| Drop Ball Test (68 g) | Passed | Passed | Passed |
| HDT, ° C. | 110 | 95 | 85 |
| Bayer Abrasion resistance- | 1.1 | 1.1 | 1.1 |
| Dyeability:  Transmittance, % | 31 | 29 | 28 |
| Colour homogeneity | Yes | Yes | Yes |

TABLE 4

Properties of the comparative polymerized products

| | Composition N° | | |
|---|---|---|---|
| | 4* | 5* | 6* |
| Refractive index ($n^D{}_{20}$) | 1.500 | 1.500 | 1.500 |
| Yellow index (5 mm) | 0.56 | 1.20 | 1.20 |
| Haze, % | 0.11 | 0.10 | 0.12 |
| Transmittance, % | 93.3 | 93.3 | 93.3 |
| Specific weight, g/cm$^3$ | 1.314 | 1.314 | 1.334 |
| Rockwell hardness (5 mm), M | 73 | 95 | 95 |
| Drop Ball Test (68 g) | Passed | Passed | Passed |
| HDT, ° C. | 41 | 59 | 50 |
| Bayer Abrasion resistance | 0.5 | 1.0 | 1.2 |
| Dyeability:  Transmittance % | 2 | 28 | 8 |
| Colour homogeneity | No | Yes | No |

*comparative composition

From a comparison of the data indicated in Tables 3 and 4, it can be observed that, even in the presence of a low concentration of radical initiator, the polymerized products obtained starting from the polymerizable compositions of the present invention (compositions 1-3) have optical and physico-mechanical properties similar to or significantly higher than those of the homopolymer of RAV 7AT® polymerized in the presence of a conventional quantity of initiator (composition 5*).

In particular, the yellow index and dyeability of the polymerized products according to the present invention are substantially identical to those of the homopolymer of RAV 7AT® that have been polymerized using a conventional quantity of initiator, i.e. a higher quantity compared to that used with the polymerizable compositions according to the present invention.

This result is completely unexpected, as it is well known that higher values of the Rockwell hardness and HDT are normally associated with a deterioration in the dyeability properties and yellow index.

It can also be observed from Table 4 that the homopolymer obtained starting from the commercial monomer RAV 7AT® in the presence of a reduced quantity of initiator (composition 4*) with respect to the quantities normally used in the state of the art has worse physico-mechanical and dyeability properties with respect to the polymerized products of the present invention.

The results also show that the polymerization of the comparative composition 6*, effected in the presence of a quantity of radical initiator identical or comparable to that used with the polymerizable compositions according to the present invention (compositions 2 and 3), produces polymerized products having worse characteristics with respect to the polymerized products of the present invention, in particular a lower HDT value and unacceptable dyeability properties.

4. Polymerizable Compositions Nr. 7-10

Additional polymerizable compositions according to the present invention have been prepared using the same components A and B of the compositions 1-3 in combination with the peroxidic initiator BPO (Perkadox CH-50L®) and optionally methyl methacrylate as reactive comonomer (component C). The chemical composition of the polymerizable compositions nr. 7-10 is indicated in Table 5.

TABLE 5

Polymerizable compositions nr. 7-10 according to the invention

| | Composition nr. | | | |
|---|---|---|---|---|
| | 7 | 8 | 9 | 10 |
| Component (A) + Component (B) | 98.0[a] | 96.9[a] | 88.4[a] | 83.6[a] |
| Component (C) | — | — | 9.8[a] (11.09)[b] | 14.8[a] (17.70)[b] |
| Peroxidic initiator | 1.9[c] (0.97)[d] | 3.0[c] (1.55)[d] | 1.7[c] (0.87)[d] | 1.5[c] (0.86)[d] |
| UV Absorber | 0.1[a] | 0.1[a] | 0.1[a] | 0.1[a] |
| Viscosity[e] (cSt) | 55 | 55 | 23.1 | 15.4 |

[a] weight percentage referring to the total weight of the polymerizable composition;
[b] Concentration of the comonomer C expressed in phm (parts by weight per 100 parts of the total weight of the components A and B);
[c] weight percentage of the commercial product Perkadox CH-50L ® referring to the total weight of the polymerizable composition;
[d] Overall concentration of peroxide compounds expressed as phm (parts by weight per 100 parts of the total weight of the components A, B and C, where the latter is present;
[e] cinematic viscosity (before the addition of the initiator) expressed in centiStokes, measured according to ASTM D446.

The polymerizable compositions Nr. 7-10 were subjected to polymerization by means of thermal treatment in a forced-air-circulation oven, with a gradual temperature rise from 60° C. to 93° C. according to the following curve: initial temperature 60° C.; temperature rise from 60° C. to 78° C. in 12 hours; temperature rise from 78° C. to 93° C. in 4 hours; maintaining at 93° C. for 5 hour.

At the end of the thermal treatment, the polymerized products (neutral lenses and flat sheets) were recovered from the moulds and heated to 120° C. for hour (in order to decompose the possible residual radical initiator).

The results of the characterization of the polymerized products are indicated in Table 6.

TABLE 6

Properties of the polymerized products according to the invention

| | Composizione N° | | | |
|---|---|---|---|---|
| | 7 | 8 | 9 | 10 |
| Refractive index ($n^D_{20}$) | 1.502 | 1.503 | 1.500 | 1.500 |
| Yellow index (5 mm) | 1.50 | 2.20 | 1.30 | 1.20 |
| Haze, % | 0.11 | 0.14 | 0.10 | 0.10 |
| Transmittance, % | 93.3 | 93.2 | 93.3 | 93.3 |
| Specific weight, g/cm³ | 1.329 | 1.329 | 1.316 | 1.308 |
| Shrinkage, % | 10.5 | 10.5 | 12.3 | 13.0 |
| Rockwell hardness (5 mm), M | 102 | 103 | 101 | 102 |
| Drop Ball Test (68 g) | Passed | Passed | Passed | Passed |
| HDT, ° C. | 75 | 90 | 70 | 66 |
| Bayer Abrasion resistance | 1.2 | 1.0 | 1.0 | 0.8 |
| Dyeability: Trasmittance % | 26 | 40 | 29 | 26 |
| Colour homogeneity | Yes | Yes | Yes | Yes |

*comparative composition

The data reported in Table 6 shows that the cured product obtained from the polymerizable composition n. 7 according to the present invention containing reduced amounts of the peroxidic initiator BPO exhibits yellow index values and dyeability properties significantly better compared to those of the cured product obtained from the polymerizable composition n. 8 containing a conventional amount of the same initiator.

The addition of the reactive comonomer (component C) in the polymerizable compositions n. 9 and 10 allows to operate a further reduction of the concentration of the peroxide initiator, without however substantially altering the properties of the polymerized products, but improving the yellow index.

The addition of the reactive comonomer, besides further reducing the amount of the radical initiator, has a positive influence on the cost of the polymerizable compositions since it allows to prepare polymerizable compositions containing lower concentrations of components A and B.

5. Preparation of Optical Lenses

Semi-finished optical lenses having a diameter of 80 mm were prepared with the polymerizable composition nr. 3 described in the previous item 3, using moulds having different geometries, assembled with adhesive tape (Okamoto Y1).

The polymerization was carried out in a forced-air-circulation oven, with a gradual temperature rise from 36° C. to 78° C. in 20 hours according to the following curve: maintaining at 36° C. for 3 hours, temperature rise from 36° C. to 50° C. in 11 hours, temperature rise from 50° C. to 60° C. in 3 hours, temperature rise from 60° C. to 78° C. in 3 hours.

Some characteristics of the lenses obtained at the end of the polymerization are indicated in Table 7.

TABLE 7

Polymerizable compositions according to the invention

| Lens N° | Mould (base)* | Mould opening | Lens breakage | Lens edge | Streaks/Flow lines |
|---|---|---|---|---|---|
| 1 | cx 6; cc 6 | Good | No | Good | Absent |
| 2 | cx 6; cc 6 | Good | No | Good | Light |
| 3 | cx 6; cc 6 | Good | No | Good | Absent |
| 4 | cx 6; cc 6 | Good | No | Good | Absent |
| 5 | cx 6; cc 6 | Good | No | Good | Absent |
| 6 | cx 6; cc 6 | Good | No | Good | Absent |
| 7 | cx 6; cc 6 | Good | No | Good | Absent |
| 8 | cx 6; cc 6 | Good | No | Good | Absent |
| 9 | cx 6; cc 6 | Good | No | Good | Absent |
| 10 | cx 4; cc 4 | Good | No | Good | Absent |
| 11 | cx 4; cc 4 | Good | No | Good | Absent |
| 12 | cx 4; cc 4 | Good | No | Good | Absent |
| 13 | cx 4; cc 4 | Good | No | Good | Absent |
| 14 | cx 4; cc 4 | Good | No | Good | Absent |
| 15 | cx 4; cc 6 | Good | No | Good | Absent |
| 16 | cx 4; cc 6 | Good | No | Good | Absent |
| 17 | cx 4; cc 6 | Good | No | Good | Absent |
| 18 | cx 4; cc 6 | Good | No | Good | Absent |
| 19 | cx 4; cc 6 | Good | No | Good | Absent |
| 20 | cx 4; cc 6 | Good | No | Good | Absent |

*cx = curvature of the front half-mould;
cc = curvature of the rear half-mould.

The data of Table 7 shows that, with the polymerizable compositions of the present invention, high-quality lenses substantially free of optical defects such as streaks and flow lines, are easily obtained, also in the presence of a low quantity of radical initiator. The yield of the production process (breakage of lenses) is also good.

6. Aging Tests

The polymerized products obtained from compositions nr. 2 and 3 described in the previous item 3, were subjected to aging tests in order to verify the stability of the properties of the polymerized products with time.

The polymerized products in the form of flat sheets having a thickness of 5 mm were continuously exposed to the open air for 90 days. The Yellow Index values (YI) of the two products, measured at certain time intervals, are indicated in Table 8 compared with the values measured on the polymerized product obtained starting from the commercial monomer RAV 7AT® (composition nr. 5*).

TABLE 6

| | Days of exposure | | | |
|---|---|---|---|---|
| | 0 | 24 | 63 | 90 |
| Composition 2 | 1.20 | 1.18 | 1.28 | 1.26 |
| Composition 3 | 1.30 | 1.28 | 1.32 | 1.30 |
| Composition 5* | 1.00 | 1.08 | 1.10 | 1.04 |

*comparative composition

The data of Table 6 show that the polymerized products of the present invention have an aging resistance equivalent to that of the commercial homopolymer RAV 7AT®.

The invention claimed is:

1. Polymerisable composition based on allylcarbonate monomers comprising (percentages by weight referred to the total weight of components A and B):
from 60% to 80% of a first reactive component (component A) of general formula (I)

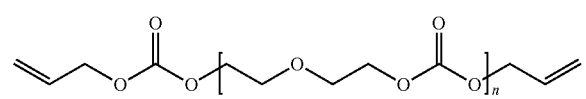
(I)

where n is an integer from 1 to 6, said component A comprising at least 50% by weight of a compound of general formula (I) wherein n is equal to 1;
from 20% to 40% of a second reactive component (component B) consisting of at least one compound of general formula (II)

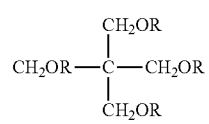
(II)

or of general formula (III)

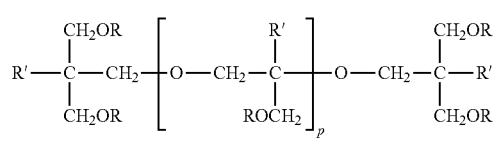
(III)

where in the above formulas (II) and (III):
p is equal to 0 or 1,
R, equal or different from each other, are selected from: a group having formula (IV)

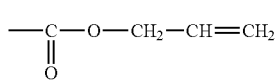
(IV)

or a group having formula (V)

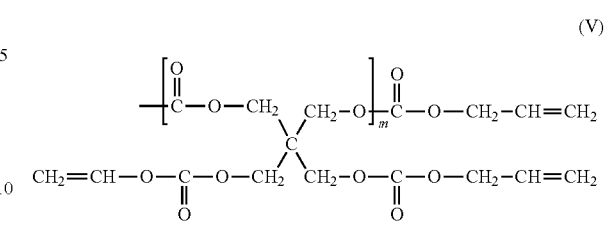
(V)

wherein m is an integer from 1 to 3;
R', equal or different from each other, are selected from: hydrogen, methyl, ethyl or a group

and
from 0.4 to 10.0 phm (parts by weight per 100 parts of the total weight of components A and B) of at least one peroxide radical initiator,
wherein the polymerisable composition is capable of producing, after being polymerized, a substantially transparent product.

2. Polymerisable composition according to claim 1, wherein said component A is obtained by reacting diallylcarbonate (DAC) and diethylene glycol (DEG) in a molar ratio DAC/DEG from 2.5/1 to 5/1.

3. Polymerisable composition according to claim 1, wherein said component B is obtained by reacting diallylcarbonate (DAC) and at least one aliphatic polyol having at least 4 alcoholic hydroxyl groups in a molar ratio DAC/polyol from 4/1 to 24/1.

4. Polymerisable composition according to claim 3, wherein said molar ratio DAC/polyol is from 4/1 to 16/1.

5. Polymerisable composition according to claim 3, wherein said aliphatic polyol having at least 4 alcoholic hydroxyl groups is selected from:
di(trimethylolpropane), pentaerythritol, di(pentaerythritol) and tri(pentaerythritol).

6. Polymerisable composition according to claim 1, wherein said component B is obtained by reacting diallylcarbonate (DAC) and pentaerythritol in a molar ratio DAC/pentaerythritol from 5/1 to 16/1.

7. Polymerisable composition according to claim 1, wherein said peroxide radical initiator is selected from: peroxymonocarbonate esters, peroxydicarbonate esters, diacylperoxides, peroxyesters and mixtures thereof.

8. Polymerisable composition according to claim 1, wherein said peroxide radical initiator is selected from the compounds of formula (VI), the compounds of formula (VII) and mixtures thereof

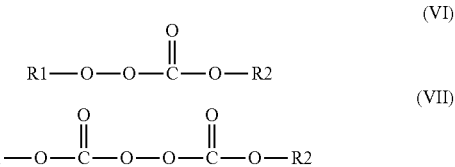
(VI)
(VII)

where R1 and R2, equal or different from each other, are selected from: C1-C20 alkyl, C1-C20 alkenyl or C1-C20 cycloalkyl.

9. Polymerisable composition according to claim 1, wherein the concentration of said peroxide radical initiator is within the range 0.4-5.0 phm.

10. A polymerised product obtained by means of thermal treatment of the polymerisable composition according to claim 1.

11. Method for producing an organic glass comprising the steps of:
   a) injecting at least the polymerizable composition according to claim 1 into at least one mould having the shape desired for said organic glass;
   b) thermally treating the composition injected into said mould to obtain said organic glass.

12. Process for preparing a polymerised product comprising the step of thermally treating a polymerisable composition based on allylcarbonate monomers comprising (percentages by weight referred to the total weight of components A and B):
   from 60% to 80% of a first reactive component (component A) of general formula (I)

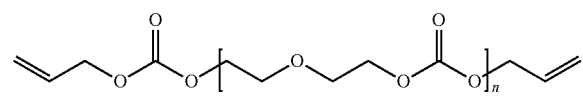
(I)

where n is an integer from 1 to 6, said component A comprising at least 50% by weight of a compound of general formula (I) wherein n is equal to 1;
   from 20% to 40% of a second reactive component (component B) consisting of at least one compound of general formula (II)

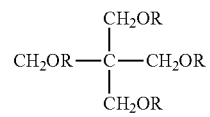
(II)

or of general formula (III)

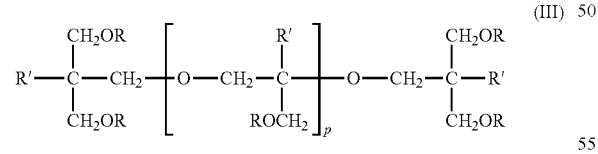
(III)

where in the above formulas (II) and (III):
   p is equal to 0 or 1,
   R, equal or different from each other, are selected from: a group having formula (IV)

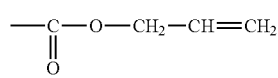
(IV)

or a group having formula (V)

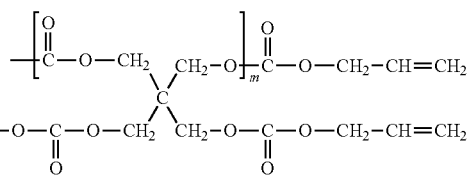
(V)

wherein m is an integer from 1 to 3;
   R', equal or different from each other, are selected from: hydrogen, methyl, ethyl or a group

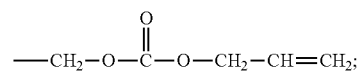

from 0.4 to 10.0 phm (parts by weight per 100 parts of the total weight of components A and B) of at least one peroxide radical initiator,
wherein the polymerised product is substantially transparent.

13. Polymerisable composition based on allylcarbonate monomers consisting of (percentages by weight referred to the total weight of components A and B):
   from 60% to 80% of a first reactive component (component A) of general formula (I)

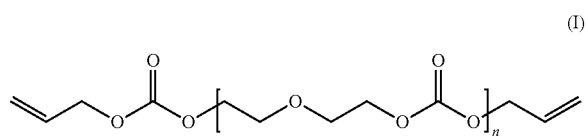
(I)

where n is an integer from 1 to 6, said component A comprising at least 50% by weight of a compound of general formula (I) wherein n is equal to 1;
   from 20% to 40% of a second reactive component (component B) consisting of at least one compound of general formula (II)

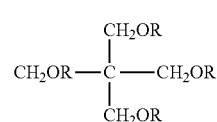
(II)

or of general formula (III)

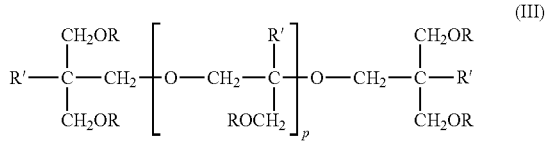
(III)

where in the above formulas (II) and (III):
p is equal to 0 or 1,
R, equal or different from each other, are selected from: a group having formula (IV)

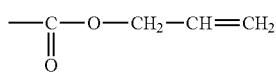
(IV)

or a group having formula (V)

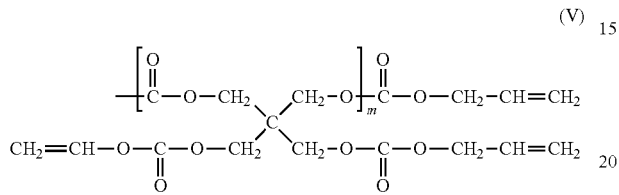
(V)

wherein m is an integer from 1 to 3;
R', equal or different from each other, are selected from: hydrogen, methyl, ethyl or a group

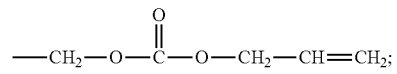

from 0.4 to 10.0 phm (parts by weight per 100 parts of the total weight of components A and B) of at least one peroxide radical initiator; and
from 0 to 2 phm of at least one of a stabilizing agent, detaching agent, dye, photochromatic dye, pigment, UV-absorber, or IR-absorber.

* * * * *